Oct. 5, 1965     J. B. JONES     3,209,448
VIBRATORY WELDING METHOD AND APPARATUS
Filed March 12, 1962     4 Sheets-Sheet 1

INVENTOR.
JAMES BYRON JONES
BY
Arthur H. Seidel
ATTORNEY

Oct. 5, 1965   J. B. JONES   3,209,448
VIBRATORY WELDING METHOD AND APPARATUS
Filed March 12, 1962   4 Sheets-Sheet 2
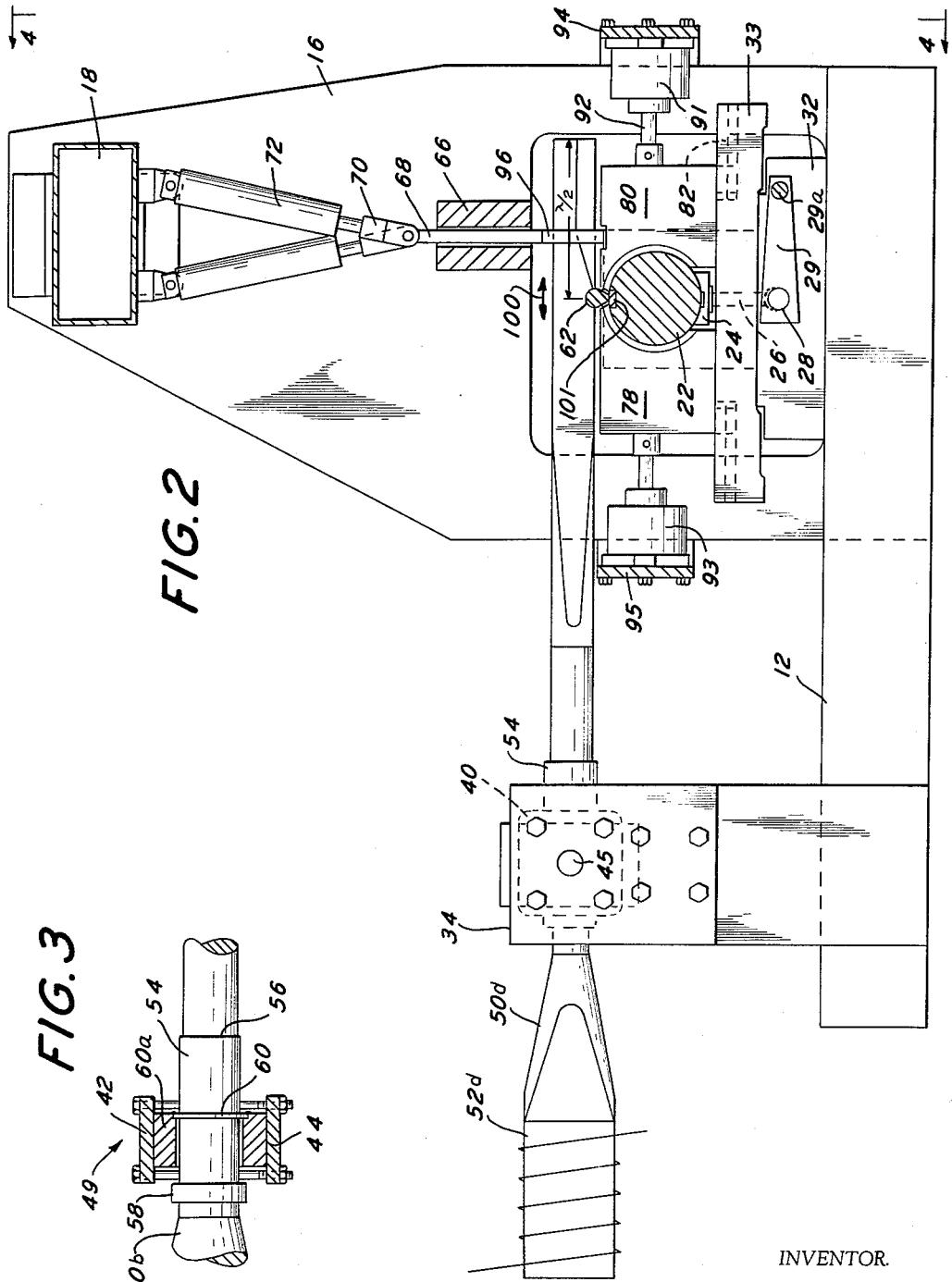
INVENTOR.
JAMES BYRON JONES
BY
Arthur H. Seidel
ATTORNEY Oct. 5, 1965
J. B. JONES
3,209,448
VIBRATORY WELDING METHOD AND APPARATUS
Filed March 12, 1962
4 Sheets-Sheet 3
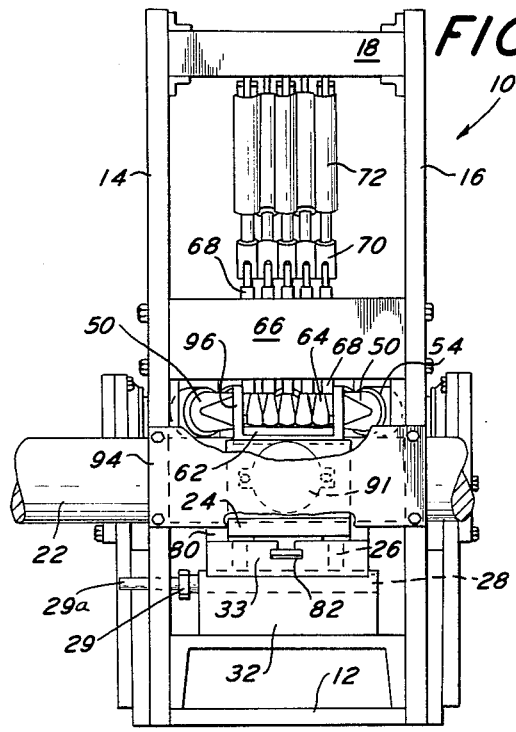
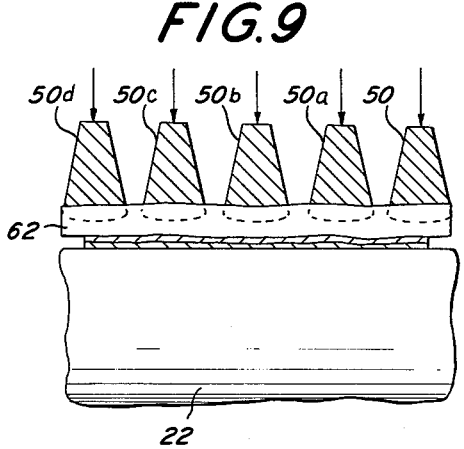
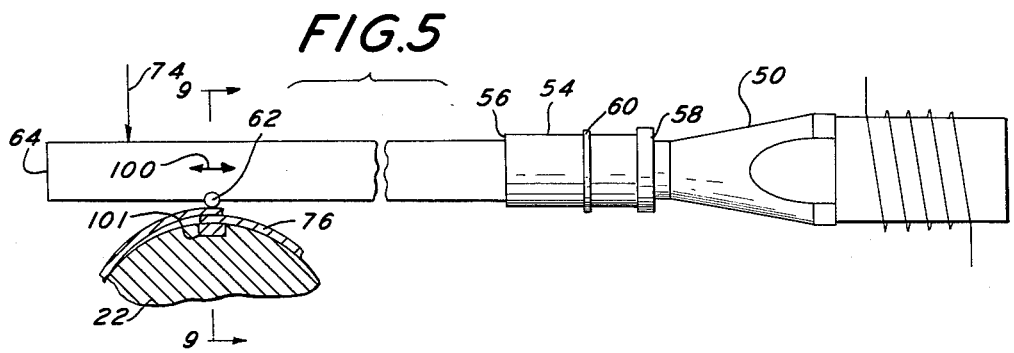
INVENTOR.
JAMES BYRON JONES
BY
Arthur H. Seidel
ATTORNEY Oct. 5, 1965   J. B. JONES   3,209,448
VIBRATORY WELDING METHOD AND APPARATUS
Filed March 12, 1962   4 Sheets-Sheet 4

INVENTOR.
JAMES BYRON JONES
BY
*Arthur H Seidel*
ATTORNEY

United States Patent Office 3,209,448
Patented Oct. 5, 1965

3,209,448
VIBRATORY WELDING METHOD AND APPARATUS
James Byron Jones, West Chester, Pa., assignor, by mesne assignments, to Sonobond Corporation, West Chester, Pa., a corporation of Pennsylvania
Filed Mar. 12, 1962, Ser. No. 179,158
23 Claims. (Cl. 29—470.1)

This invention relates to vibratory welding, and more particularly, to an apparatus and method for elongated weld area vibratory welding.

In the packaging of many types of products, it is necessary to hermetically seal the container. The hermetic seal of the container normally extends along an elongated area such as along the side or end of a pouch, packet, toothpaste tube, can, etc. Heretofore, the hermetic-sealed elongated closure has been made by crimping, sealing with cement or adhesive, heat sealing, sealing with plastic liners, etc. These closures have often been difficult, time consuming, and expensive to make, and are unsatisfactory for some applications. Hermetically-sealed elongated closures have been provided on containers such as can bodies, for example, by means of welding, soldering, and other heat-sealing methods. However, these latter mentioned methods involve the use of considerable heat during the joining process. There are many types of containers, and/or products to be packaged, for which such closure methods are unsuitable because of the adverse effect of heat and/or spatter or byproducts thereof.

In U. S. Patents 2,946,119; 2,946,120; and 2,985,984, there is disclosed apparatus and method for welding together workpieces by means of vibratory welding. Vibratory welding offers a great many advantages for forming hermetically sealed closures. For example, vibratory welding does not involve the use of any special sealing or filler agents, there need to be no significant deformation of the workpieces being welded together, and there is relatively little heat generated in the weld area (too little heat, for example, to develop a cast structure in metal or alloy weldments). In addition, vibratory welding provides joints of sufficiently high strength as may be required by a particular hermetically sealed closure. Moreover, little or no pre-weld or post-weld cleaning is usually required; special joint designs or post-weld cleaning is usually required; special joint designs are usually unnecessary; no high currents are needed, relatively low power from standard voltage sources being generally used; actuation of the equipment can be synchronized with existing machinery by many straightforward methods; the power source can be remotely located from the welding area; and relatively low equipment maintenance is involved.

Vibratory welds having an elongated weld area may be made with reference to the disclosures in the aforesaid patents. Thus, an elongated weld area can be achieved by consecutive partial overlapping of a series of spot-type vibratory welds. This method of obtaining an elongated weld area is often time consuming and expensive. On the other hand, continuous-seam vibratory welds having an elongated weld area and made with roller-type apparatus are faster to make and neater in appearance than overlapping spots, but reliable continuous-roller-seam welding involves complicated rotary and/or traversing mechanisms. Neither the overlapping-spot-weld method nor the roller-seam weld method provides an elongated weld area with a single or extremely short weld pulse interval, such as in a fraction of a second.

It has been discovered that a vibratory weld having an elongated area of appreciable line-like length may be obtained with a single weld time pulse interval with a uniform quality of bond over the entire length of the weld. This has not been practical heretofore, in view of the state of the mechanical vibratory art in general, and in view of the stringent tolerances requisite in connection with the making of many types of elongated hermetically sealed closures.

It is an object of the present invention to provide a novel apparatus employing vibratory energy for elongated weld area welding.

It is another object of the present invention to provide a novel method employing vibratory energy for elongated weld area welding.

It is another object of the present invention to provide a novel apparatus and method for providing an elongated weld area vibratory weld.

It is another object of the present invention to provide a novel apparatus and method employing vibratory energy wherein an elongated weld area may be provided with a single pulse interval.

It is still another object of the present invention to provide a novel apparatus and method employing vibratory energy in the forming of a hermetic seal on container bodies.

It is still another object of the present invention to provide a novel apparatus and method employing vibratory energy for welding wherein it is possible to apply different forces to maintain the workpieces in intimate contact at spaced points along the weld zone.

Other objects will appear hereinafter.

For the purposes of illustrating the invention there is shown in the drawings forms which are presently preferred; it being understood, however, that this invention is not limited to the precise arrangement and instrumentalities shown.

FIGURE 2 is a longitudinal sectional view taken along the lines 2—2 in FIGURE 1.

FIGURE 3 is a transverse sectional view taken along the lines 3—3 in FIGURE 1.

FIGURE 4 is an end view taken along the lines 4—4 in FIGURE 2.

FIGURE 5 is a side elevation of a single vibratory element from the assembly illustrated in FIGURE 1.

FIGURE 9 is a transverse sectional view taken along the lines 9—9 in FIGURE 5 and illustrating the ability of the tip to accommodate itself to variations in thickness of the metal members, or to accommodate apparent thickness variations resulting from tip and/or anvil face pickup or to accommodate variations in tip surfaces resulting from tip dressing which may be necessary from time to time.

Figure 1:
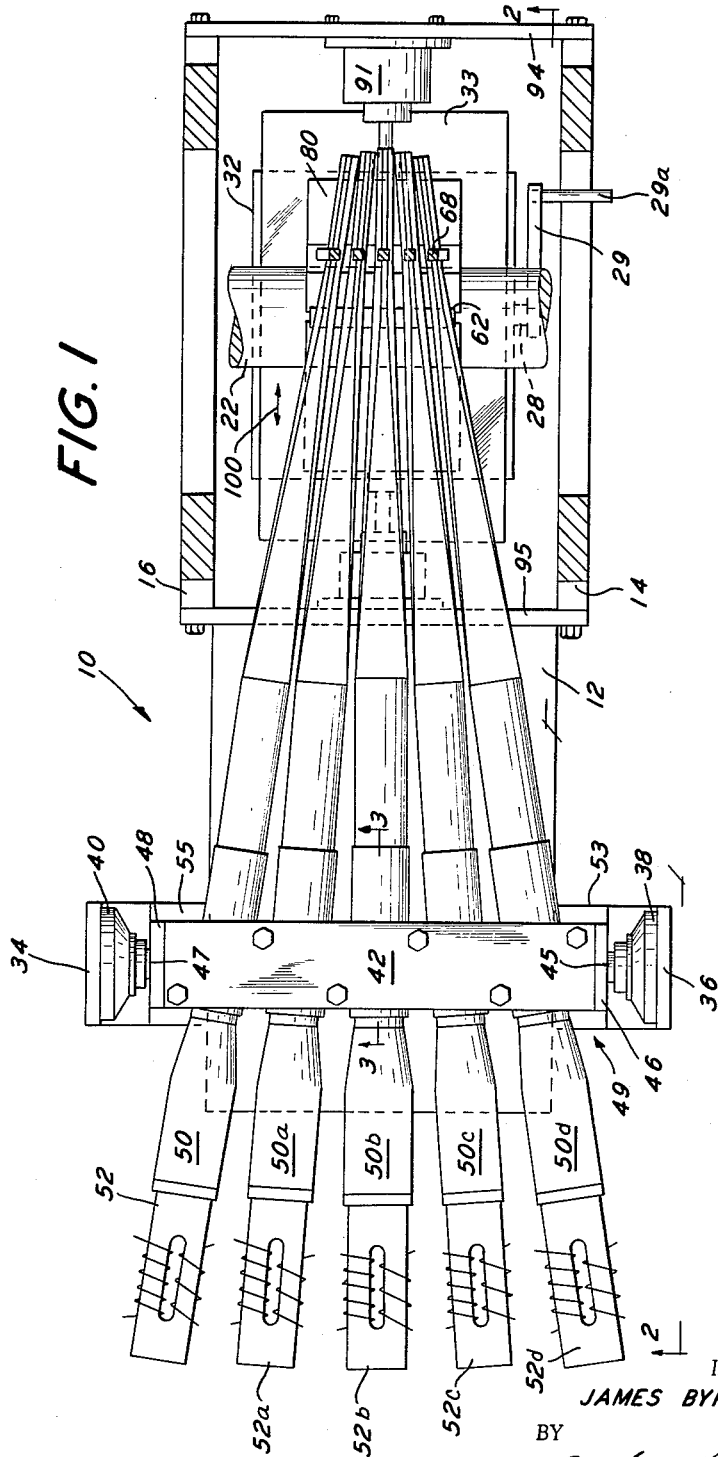
FIGURE 1 is a top plan view of the apparatus of the present invention.
Figure 6:
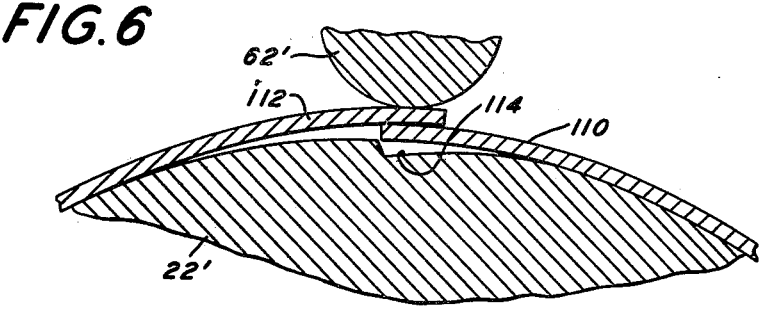
FIGURE 6 is an enlarged sectional view of a modified anvil.
Figure 7:
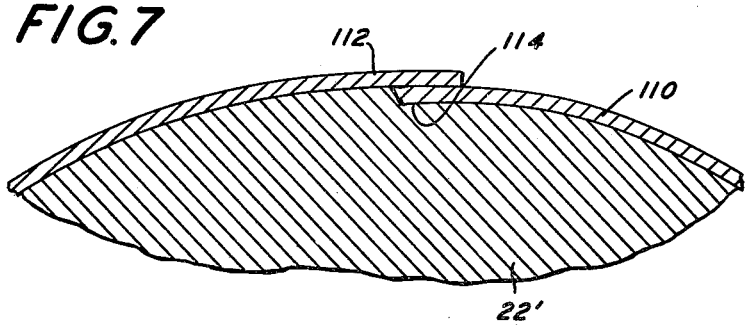
FIGURE 7 is a view similar to FIGURE 6 after a weld has been accomplished.

The contact size or area of a suitable vibratory tip which is to be applied to a work area has been inherently related to the dimensions of the vibratory system to which it is attached and thus to the design frequency of the system. Such dimensions, particularly for operation in the so-called ultrasonic frequency range, are usually relatively small, especially the cross-sectional dimensions. Whereas an elongated area weld produced within a single short time pulse or interval dictates an appreciable work-contacting length of tip, it is ordinarily inefficient (and may even be inoperative, especially for high-power applications as, for example in delivering energy to solid material for effecting changes therein) to use a tip whose work-contacting length is appreciably greater than the tip-contacting end dimension of the acoustical coupling member to which the tip is attached or of which the tip forms an integral part. Normally, in practical work-performing vibratory equipment, such as equipment vibrating at ultrasonic frequency, this end dimension must be no greater than about one-quarter wavelength of mechanical vibration in the material at the operating frequency. Inefficient operation of the vibratory system, of which the tip is a vital component whether or not it is physically integral therewith, can cause altogether unacceptable results, or require the use of excessively-powered equipment in an effort to compensate for the inefficient operation.

Furthermore, an elongated area weld having a length, for example, of from about five to eight inches and a width of about 0.035 to 0.10 inch, involves a plan form weld area of about 0.17 to 0.70 square inch. A vibratory spot weld, such as a spot weld between two sheets of aluminum 0.040 to 0.050 inch thick, is roughly circular with a diameter of about 0.2 to 0.25 inch. Such a vibratory spot weld size may be obtained, for example, with a 2000–4000 watt capacity vibratory spot welder having a design frequency of 15 kc., and its plan-form weld area is about 0.04 square inch. Thus, the power requirement implications for making an elongated area weld in a very short single weld interval are also very substantial.

Moreover, iin making quality hermetic-seal elongated-weld-area closures by means of vibratory welding, it has been found that the elongated vibratory welding tip must be in forceful and especially uniform contact with the workpiece along the entire length of the tip. That is, clamping forces must be disturbed both locally and generally over the entire length of the weld zone. If this situation does not prevail with reasonable precision, the elongated weld will be intermittent in quality so as to include over-welded and damaged portions, slightly-welded portions, and sometimes unwelded portions. In addition, if the tip is not in forceful uniform contact with the workpiece along the entire tip length, and firmly and rigidly supported with the workpiece being backed up by a non-compliant anvil (one of the workpieces may be sufficiently massive so as to function as a non-compliant anvil), the tip will not excursion as a unit (i.e., with essentially no variation in amplitude or phase of vibration along its length) and great variations in tip excursion along the length of the welding tip will be encountered. Such variations present difficult acoustical problems such as cross-coupling (the welding tip will execute S-curved displacements) and unequal excursion (which may result in a fracture of a portion of the system). Also, of course, accommodation must be made for sheet tolerances, that is, differences in the workpieces in the weld area due to surface irregularities or other manufacturing imperfections.

The welding array must also be capable of delivering the vibration in such a manner as to effect vibratory welding. Thus, for the vibratory welding of metallic materials (including metals, alloys, metalloids, semimetals and sintered metal powder products, etc.) to themselves or to other materials, the vibration must be in a direction which is essentially perpendicular to the direction of applied force and parallel to the interface between the members of the weldment.

Referring to the drawings in detail, wherein like numerals indicate like elements, there is shown in FIGURE 1 an apparatus for employing vibratory energy for bonding members together designated generally as 10.

The apparatus 10 comprises a base 12 having side plates 14 and 16. A crosstube 18 extends between and has its ends fixedly secured to the plates 14 and 16. A non-compliant anvil 22 in the form of a solid cylindrical bar is provided with a saddle block support 24. The support 24 is interconnected with the upper end of a plurality of upright reciprocably disposed cam follower rods 26. A cam block 32 is fixedly supported by the base 12 and a clamping fixture 33 is supported by the block 32.

An eccentric 28 is rotatably supported by the cam block 32 below the anvil 22. The rods 26 are guided by the block 32 and fixture 33. A handle 29 having an offset arm 29a is connected to the eccentric 28 and is adapted to rotate the same to raise and lower the rods 26. As the rods 26 are raised, the saddle block support 24 is raised to a position wherein it provides additional support for the anvil 22 during welding.

As shown more clearly in FIGURES 1 and 2, upright mounting plates 34 and 36 are secured to base 12 on opposite sides thereof. A ball bearing flanged cartridge 38 is secured to plate 36 and rotatably supports pin 45. A ball bearing flanged cartridge 40 is secured to plate 34 and rotatably supports pin 47. The end of pin 45 remote from plate 36 is connected to end plate 46 of a rectangular shaped rotatable coupler support 49. Likewise, the free end of pin 47 is connected to plate 48 of support 49. The end plates 46 and 48 of support 49 are interconnected by top plate 42 and bottom plate 44. Plates 42, 44, 46 and 48 may be made of copper or some other high-damping material to suppress resonance.

A plurality of welding units disposed in side-by-side relationship extend through the support 49. Each welding unit includes an acoustical coupler axially joined, preferably by a metallurgical joint to a vibration-generating means (i.e., an acoustical transducer). Since each unit is identical, only one unit need be described in detail. Each unit is of conventional one-half wavelength dimensioning, such as is well known to the art.

The coupler 50 (which is an integral number of one-half wavelengths long in the material and geometry of the coupler, and which is preferably made of metal such as Monel, aluminum-bronze, beryllium-copper, etc.) is axially secured to the vibration-generating means 52 (which when magnetostrictive is one-half wavelength long), preferably by a metallurgical joint, at a loop or antinode location of the mechanical vibration of each of these two members.

A force-insensitive mount 54 is provided for the coupler 50. The mount 54 comprises a sleeve having one end 56 metallurgically joined to the coupler and an end 58 which is free from attachment. A flange 60 is provided on the sleeve at a node. The flange 60 is joined, as by clamping, to the upper and lower members 42 and 44 through transition collar 60a which may be bonded to the flange 60 as by brazing and which has rectangular outer surfaces so as to be mechanically clamped between the plates 42 and 44. This transition collar 60a is preferably made of a damping material such as copper. The force-insensitive mount 54 is well known to those skilled in the art and is described more fully in U.S. Patents 2,891,178; 2,891,179 and 2,891,180. Accordingly, it is not deemed necessary for an understanding of the present invention to describe the force-insensitive mount 54 in detail.

A welding tip 62 extends transversely across the couplers 50 through 50d. The welding tip 62 is metallurgically joined to each of the couplers at a point spaced from the free end of the couplers. Thus, the tip 62 is spaced from the free end 64 of the coupler 50 by a distance which is preferably one-half of a wavelength according to the properties of the material and geometry of the coupler 50.

As shown more clearly in FIGURES 2 and 4, a guide 66 extends between and is supported by the side plates 14 and 16. The guide 66 is a sandwich structure having a large center slot. A plurality of pins 68 extend in side by side relationship through the slot in guide 66. As shown more clearly in FIGURE 2, the lower extremity of the pin 68 is in abutting contact with the coupler bar 50 at a point between the free end 64 and the tip 62. The pin 68, as will be made clear hereinafter, enables a force to be applied to the coupler 50 at a true acoustical node located between the tip 62 and the free end 64.

The upper end of each of the pins 68 is pivotally connected to a clevis 70 or the like. A piston rod is secured to each of the clevises 70 and extends into a separate one of a plurality of piston cylinders 72 which correspond in number to the number of couplers. The uppermost end of the piston cylinders 72 are each pivotably secured to the crosstube 18. It will be appreciated that the conduits for supplying motivating fluid (such as compressed air or oil under pressure) to the piston cylinders 72 have not been illustrated. When motivating fluid is supplied to the piston cylinders 72, a force at the position and in the direction of arrow 74 may be applied to each of the couplers.

The force applied in the direction and at the location of arrow 74 enables the couplers and the tip 62 to pivot about the longitudinal axis of the pins 45 and 47. The magnitude of the force 74 need only be sufficient so as to maintain the entire length of the tip 62 in contact with the overlapping edges of the members of the weldment, as, for example, the can body 76, so that said overlapping edges are maintained in intimate contact at the intended weld zone. The tip 62 has a length so that it extends slightly beyond each end of the weldment members, namely, can body 76, such as for a distance of approximately one-quarter inch. This length relationship provides a safety factor and assures that the overlapping edges of the members to be welded will be joined by a vibratory weld along its entire length.

The cylindrically shaped can body 76 is held in a disposition so that its overlapping free edges are below the tip 62 by a pair of pressure blocks 78 and 80. As shown more clearly in FIGURE 2, the pressure blocks 78 and 80 are provided with a concave surface juxtaposed to and spaced from the outer peripheral surface of the anvil 22. The pressure blocks 78 and 80, and their respective actuators are identical. Accordingly, only the actuating mechanism of the pressure block 80 will be described in detail.

The pressure block 80 is guided for reciprocatory movement toward and away from the anvil 22 by a T-shaped lug 82 which rides in and is guided by a T-shaped slot in fixture 33. Movement of block 80 is effected by a pressure cylinder 91. The block 80 is connected to a variable chamber member such as a piston in cylinder 91 by means of a rod 92. The block 78 is actuated by cylinder 93. The cylinders 91 and 93 are supported in the positions illustrated by bracket arms 94 and 95, respectively, which extend between the side plates 14 and 16.

It will be noted that a groove is provided on the upper surface of block 80 to accommodate a strap or bail 96 which is preferably made of plastic such as nylon and assists in raising the couplers 50–50d upwardly. The strap 96 is U-shaped and has its free ends secured to the two outermost ones of the pins 68.

Each of the transducers for the couplers 50–50d may be separately and individually controlled as to power. However, all of the transducers are ordinarily coupled to a single power source such as a motor alternator or electronic power supply which operates at the precise frequency that is common to all of the transducers. It has been found that a better weld extremity is sometimes obtained if the power supply of the transducers 52 and 52d is slightly greater than that of the transducers 50a–50c.

The apparatus 10 operates as follows:

The vibratory energy generating means secured to each of the couplers 50–50d may be of the magnetostrictive type or of the piezoelectric type or of other known types and generates vibratory energy in a manner well known to those skilled in the art. Such vibratory energy causes the couplers to vibrate axially, i.e., in longitudinal vibration. Such vibratory energy is delivered by the tip 62. The tip 62 may be made of the same material as the coupler or may be made of a different material, and is located at a vibratory loop region on each of the couplers. The tip 62 delivers energy to the overlapping intimately contacting surfaces of the members to be welded such as the edges of the can body 76 in a direction which is perpendicular to the direction of the applied force and parallel to the interface of the said surfaces, thereby effecting a vibratory weld therebetween.

It is to be noted that, while the same amount of force may be applied to each of the coupler members, the force applied to each of the coupler members may also differ as desired and as will be explained below.

The amount of force should be sufficient to hold the workpieces to be welded in firm contact at the intended weld interface. The clamping force may thus be varied over a wide range. In a preferred embodiment, the maximum clamping force need not produce a deformation of more than about ten percent and may not produce any appreciable deformation at all. By deformation is meant the loss in thickness of the weldment at the center of the weld zone divided by the aggregate thickness of the workpieces prior to welding, with the result multiplied by 100 to obtain percentage. The conditions under which welding is to take place have been generally developed as indicated in the above-mentioned patents and need not be described in detail.

As illustrated, the vibration generating means or transducer 52 is of the magnetostrictive type and consists of a stack of metal laminations, such as laminations of nickel, or well known alloys such as nickel-cobalt, iron-cobalt-vanadium, iron-aluminum, etc., properly dimensioned to insure axial resonance with the frequency of the alternating current applied thereto, so as to cause it to increase or decrease in length according to its coefficient of magnetostriction. The energizing and polarizing means conventionally used with such a transducer are well known to the art.

In place of the aforesaid metallic magnetostrictive materials, the vibration generating means or transducer may comprise almost any material which has good physical properties and which will change its physical dimensions under the influence of an electric potential. Thus, the vibration generating means may comprise an electrostrictive material such as barium titanate, lead zirconate titanate, etc., or sophisticated sandwich assemblies of wafers made of such materials. The magnetostrictive materials have a preferred operating range at frequencies below about 75,000 cycles per second. Ceramic transducer assemblies comprising sandwiches can be built to operate in about the same frequency range as or higher than the magnetostrictive materials, and they have several times the conversion efficiency of a nickel stack. This conversion efficiency, if it can properly be utilized, lowers operating power requirements of equipment. For example, a nickel stack may have an over-all efficiency of 18–30%, whereas a properly designed transducer assembly comprising ceramic washers can have an over-all efficiency of as high as about 90%.

Means such as transducers 52 are provided for vibrating the acoustical coupling members 50 through 50d at a frequency of between about 59 and 300,000 cycles per second, with the preferred frequency being a frequency between about 500 and 100,000 cycles per second. Sufficient vibratory energy is supplied to and delivered by the tip 62 so that the workpieces are welded together by an elongated-weld-area non-fusion vibratory weld. That is, the weld is a solid-state weld, lacking the cast structure which is typical of a weld obtained by melt-weld processes, lacking the extreme external deformation of the weldment members which is characteristic of pressure welding, but having the interface between the weldment members which is characteristic of a vibratory weld.

As illustrated in the drawings, five transducer-coupler elements are provided. However, a greater or lesser number of transducer-couplers may be provided depending on the length of weld desired. In use, a 5.5-inch long tip 62 was metallurgically bonded to five couplers and utilized to make an elongated weld having a length of five inches, which was the length of the can body. The elongated weld had a width of .05 inch. Of particular significance is the fact that such a five-inch length weld was provided with a single pulse time interval of vibratory energy. Each of the transducer-coupler elements was dimensioned to operate at 15,000 cycles per second. Electrical power input to the five elements totaled about 4,000 watts. The total clamping force applied was 420 pounds per linear inch of weld, or 2,100 pounds. The weld was made in 0.2 second between the overlapping edges of a can body made of 0.010-inch-thick 5052–H36 aluminum alloy.

Figure 8:
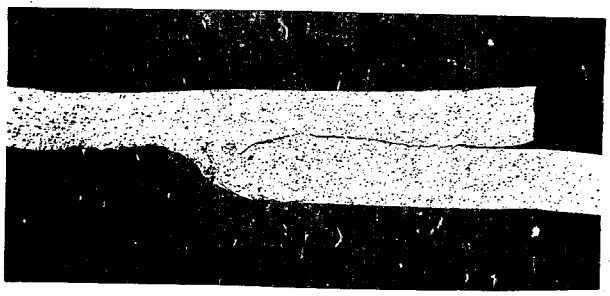
FIGURE 8 is a photomicrograph of the weld in FIGURE 7 for .0094 inch thick 5052–H16 aluminum alloy welded to itself.

As shown more clearly in FIGURE 8, the elongated weld provided a clean fillet for the inside of the package which was free from cracks and crevices in which dirt and bacteria might lodge and lead to contamination of the can product. Also, the weld was in some cases nearly twice as strong as the soldered-side-seam or adhesively-bonded-side-seam utilized on can bodies heretofore. Accordingly, the welding apparatus of the present invention is capable of being utilized on can bodies where a sanitary standard is required. On test runs, welds having a tensile shear strength between 85–95 percent of the parent metal were obtained.

The crack free joint illustrated in FIGURE 8 was obtained by providing a recess 114 in the anvil 22'. The edge portion 110 of a can body overlies the recess 114 and edge portion 112 overlies the edge portion 110. The tip 62' is positioned so that it will excursion across the edge on portion 110 thereby causing the same to enter recess 114 and be welded to the inner surface of portion 112.

Elongated welds have been made by cold pressure welding die tools heretofore. However, the extreme deformation required to achieve cold pressure welding in aluminum and other metals, especially in connection with a very long line-like weld, is a deterrent to its use commercially for this purpose. The elongated weld made in accordance with the present invention need have little or no external deformation at the weld zone.

As indicated above, the tip 62 preferably has a length slightly greater than the length of the intended weld zone. The tip 62 need not have a resonant length (such as one-half wavelength, one wavelength, etc., at the system design frequency). It will be noted that the longitudinal axis of the tip 62 extends in the same direction as the longitudinal axis of the vibratory weld. Also, it will be noted that the vibratory excursion of the tip 62 is in the direction of the double-headed arrow 100 so that the direction of the tip vibration is across the width of the weld and not in the direction of the length of the weld. The width and height of the tip should be as small as is consonant with rigidity and durability under vibrating conditions and with the width of the weld desired. A tip which is too massive can have undesirable energy-dissipation effects. Too wide a weld may be an unnecessary waste of power, as well as providing welding of unequal quality across the width band in sections too remote from the indicated location with respect to the coupling members.

Low bending stiffness in the vertical plane of the tip 62 is provided by utilizing a relatively small cross-section rod-like welding tip. As indicated in FIGURES 2, 4 and 9, a multiple-piston type of hydraulic or other application of clamping force can be used to provide an individual clamping force for each of the couplers. Due to the aforesaid low bending stiffness of the rod-like tip, this individual application of force will cause the tip to conform (whiffletree-like) to local and general irregularities along the length of the weld zone.

It is to be noted that other uses may be found for the individual application of force to the separate couplers and from thence to the work. For example, a type of "swaging" or "forming" may be accomplished at the ends of the elongated weld area vibratory weld, if greater amounts of force are exerted at those ends. Thus, the end areas, one or both, may be thinned deliberately during the welding operation. This may be important, for example, in making some types of can bodies, wherein the ends are flanged in a subsequent operation. The thinned area is adaptable to such a flanging setup and to accepting the embracing edge of the can lid which is applied in a subsequent operation.

Also, there may be different levels of power applied to each of the transducers 52, rather than an equal amount of wattage supplied to each transducer. This is particularly pertinent with respect to the transducer-coupler elements positioned at each end of the intended weld area, inasmuch as the center elements more or less reinforce one another's vibratory effect on their respective contact portions of the tip and therefore on the respective weld area portion, whereas the end elements are reinforced in this manner only on one side.

The general conditions under which welding should take place such as surface cleaning, temperature, amount of clamping force required, weld time, etc., are easily determined by those skilled in the art and set forth in detail in the above mentioned patents. Accordingly, it is not deemed necessary to repeat the same herein.

The anvil for the present invention may consist of a heavy material, such as copper or tungsten, having a replaceable insert of steel or the like, such as insert 101 of FIGURE 2, for purposes of wear along the area where the weld is generated. The anvil is non-compliant in the direction of the double headed arrow 100. The anvil may have a variety of shapes so as to accommodate special geometries to be welded, such as cans or the like.

While the apparatus 10 illustrates a particular type of means for applying a clamping force to the workpieces and for maintaining the cylindrical shape of the can bodies, it will be appreciated by those skilled in the art that equivalent structures may be substituted therefore. It will be noted that the arcuate upper surface on the support 24 cooperates with the concave inner periphery of the blocks 78 and 80 to define a gripping support means which is substantially a 340–350 degree arc.

It will be appreciated that the anvil supporting element for the workpieces in the various embodiments of the present invention comprises an element having a length approximately the length of the welding tip 62 or somewhat longer. Also, it will be appreciated that any one of a variety of geometries may be provided for the couplers. In FIGURE 1 of the illustrated embodiments, it is evident that coupler 50b is disposed at a 90-degree angle to the axis of tip 62 and that each of the other couplers 50, 50a, 50c, 50d is disposed at a somewhat smaller angle than 90 degrees to the longitudinal axis of the tip.

As used hereinafter, the tip may be recited as having an elongated workpiece engaging surface. The word "elongated" in this respect is to be interpreted as having a length which is at least twenty times its width.

The present invention may be embodied in other specific forms without departing from the spirit or essential attributes thereof and, accordingly, reference should be made to the appended claims, rather than to the foregoing specification as indicating the scope of the invention.

I claim:
1. Apparatus for non-fusion welding contacting members together comprising a plurality of force-applying members, an elongated tip extending transversely across said members and rigidly secured to said member at an antinode on each member, means coupled to said force-applying members for impelling said tip against an outer face of one of said contacting members with a force in a direction and of a magnitude to hold the to-be-welded faces of the members in intimate contact at the intended weld zone and to couple mechanical vibratory energy into the intended weld zone, and means for vibrating said tip at a frequency of between about 59 and 300,000 cycles per second in a path substantially perpendicular to the direction of the applied force while such to-be-welded faces of the members are being held in intimate contact by engagement with said tip, with said vibrating means being connected to each force applying member to vibrate the same in an axial direction at substantially the same frequency while furnishing sufficient power so that the mechanical vibration delivered by said tip in said path is at a sufficient energy level to weld the members together with an elongated seam-type weld with a single power impulse.

2. Apparatus in accordance with claim 1 wherein said impelling means applies said force along the entire length of said tip.

3. Apparatus in accordance with claim 2 wherein the number of said force-applying members is sufficient so that a force-applying member is secured to said tip along substantially the entire length of said tip.

4. Apparatus in accordance with claim 3 wherein said impelling means applies a force to each of said members at a point spaced between a free end of said members and said tip, with such point being at a vibratory node in said members.

5. Apparatus in accordance with claim 3 wherein each of said force-applying members has a longitudinal axis forming an angle of not more than 90 degrees with the longitudinal axis of said tip, and each of said force-applying members being on the same side of said tip.

6. Apparatus in accordance with claim 1 including a non-compliant anvil for supporting said members at the intended weld zone, and jaw blocks reciprocably supported for movement toward and away from said anvil, each jaw block being adapted to hold one of said members in abutting contact with said anvil.

7. Apparatus in accordance with claim 1 wherein members to-be-welded are ferrous metals.

8. Apparatus for non-fusion welding contacting metal members together comprising an elongated tip, means for impelling said tip against an outer face of one of said contacting metal members with a force in a direction and of a magnitude to hold the to-be-welded faces of the metal members in intimate contact at the intended weld zone and to couple mechanical vibratory energy into the intended weld zone, said tip having a longitudinal axis substantially perpendicular to the direction of applied force and substantially parallel to the intended weld zone, and means for vibrating said tip at a frequency of between about 500 and 100,000 cycles per second in a path substantially parallel to the interface of the metal members being welded while such to-be-welded faces of the metal members are being held in intimate contact by engagement with said tip, with said vibrating means furnishing sufficient power so that the mechanical vibration delivered to said tip is substantially perpendicular to said path and is at a sufficient energy level to weld the metal members together with a seam-type weld with a single vibratory energy impulse.

9. Apparatus for non-fusion welding contacting members together comprising a plurality of force-applying members, a tip extending across and secured to said force-applying members at antinode locations thereon, means for impelling an elongated work engaging surface on said tip against an outer face of one of said contacting members with a force in a direction and of a magnitude to hold the to-be-welded faces of the members in intimate contact against a non-compliant anvil at the intended weld zone and to couple mechanical vibratory energy into the intended weld zone, said means being structurally interrelated with said members at a node on said members located between said tip and free ends of said members and means for vibrating said tip along its entire length at a frequency of between about 59 and 300,000 cycles per second in a path substantially perpendicular to the direction of the applied force while such to-be-welded faces of the members are being held in intimate contact by engagement with said end portion of said member, with said vibrating means being connected to each member to vibrate the same in an axial direction thereof at substantially the same frequency while furnishing sufficient power so that the mechanical vibration delivered by said end portion in said path is at a sufficient energy level to weld the members together by a continuous seam-type weld with a single vibratory energy impulse, and said weld having a length to width ratio of at least twenty to one.

10. Apparatus in accordance with claim 9 including means for selectively varying the force applied along the length of said tip.

11. Apparatus in accordance with claim 9 wherein said anvil is provided with a recess for receiving the extreme edge of one member so that the tip may excursion across said edge to join said edge to the other member by a crack free weld.

12. A non-fusion method for welding members together which method comprises placing to-be-welded faces of the members together, applying a force to the members in a direction and of a magnitude to hold the contacting to-be-welded faces of the members in intimate contact at the intended weld zone and to couple mechanical vibratory energy into said zone, and introducing through an elongated vibrating element contacting one of the to-be-welded members with an elongated surface extending substantially parallel to the intended weld zone and perpendicular to the direction of applied force, mechanical vibrations having a frequency of between about 59 and 300,000 cycles per second, with the intended weld zone corresponding to the length of said vibrating element surface in contact with said one member, and said mechanical vibration comprising a vibration component in a direction substantially perpendicular to the direction of applied force and to the length of the vibrating element, and with such component being of an energy level sufficient to weld the members to each other with a seam-type weld by a single vibratory energy impulse, said holding force being applied to the members by being coupled to the vibrating element.

13. A method in accordance with claim 12 including transmitting said mechanical vibration to said vibrating element along substantially the entire length of said vibrating element by transmitting the vibration through a plurality of couplers each connected to said element in a manner whereby the element extends transversely across the couplers and is connected thereto at an antinode on said couplers.

14. A method in accordance with claim 12 wherein said members are metal and have a thickness between .0025 inch and .15 inch.

15. A method in accordance with claim 14 wherein said metal is aluminum having a thickness between .004 inch and .012 inch.

16. A method in accordance with claim 12 wherein said members comprise overlapping edges of a metal can body.

17. A method in accordance with claim 12 wherein said mechanical vibration is introduced through said elongated vibrating element in a manner so that said element excursions across an extreme free edge of the other member so that the weld coincides with said edge.

18. A method in accordance with claim 12 wherein the length of the elongated surface is approximately 100 times the width of the surface on said element.

19. A non-fusion method for making can bodies which comprises placing an aluminum sheet around a cylindrical non-compliant anvil so that juxtaposed edges of the aluminum sheet are in overlapping relation, applying a force to said sheet to maintain said sheet in such disposition around said anvil, applying a holding force to said overlapping edges in a direction and of a magnitude to hold the overlapping edges in intimate contact at the intended weld zone and to couple mechanical vibratory energy into said zone, introducing through a vibrating element contacting one of the overlapping edges adjacent the weld zone with an elongated surface extending substantially parallel to the intended weld zone and perpendicular to the direction of the last mentioned force mechanical vibration having a frequency of between about 59 and 300,000 cycles per second, with said vibrating element contacting said one overlapping edge along its entire length thereby defining the length of the weld zone, said mechanical vibration comprising a component in a direction substantially parallel to the interface of the overlapping edges and perpendicular to the length of the weld, and with such component being of an energy level sufficient to weld the overlapping edges together with a seam-type weld by a single impulse, said holding force being applied to the edges by being coupled to the vibrating element.

20. A method in accordance with claim 19 wherein said mechanical vibration is introduced in a manner so the vibrating element excursions across the other of said edges.

21. A method in accordance with claim 19 including the step of bending the ends of the so formed can body to provide a radially outwardly directed flange on each end of the can body.

22. Apparatus comprising a plurality of vibratory energy couplers, a discrete vibration generating means axially connected to a first end of each one of said couplers to vibrate said couplers in an axial direction at substantially the same frequency, a work performing tip extending across and connected to each coupler at an antinode spaced from a second end of each coupler by a distance corresponding to an integral number of one-half wavelengths according to the properties and geometry of said couplers, and means for applying a static force to said couplers at a vibratory node in said couplers between said tip and said second end of said couplers.

23. Apparatus in accordance with claim 22 including a common rotatable support for said couplers, and the distance between said support and said first end of said couplers being less than the distance between said support and said second end of said couplers.

References Cited by the Examiner
UNITED STATES PATENTS

| | | | |
|---|---|---|---|
| 896,218 | 8/08 | Lachman | 219—86 |
| 2,608,887 | 9/52 | Sowter. | |
| 2,718,697 | 9/55 | Soss | 310—26 X |
| 2,985,954 | 5/61 | Jones et al. | 29—470.1 X |

JOHN F. CAMPBELL, *Primary Examiner.*